United States Patent
Jeong et al.

(10) Patent No.: US 10,687,201 B2
(45) Date of Patent: Jun. 16, 2020

(54) APPARATUS AND METHOD FOR DELIVERING SHORT MESSAGE SERVICE EFFICIENTLY IN WIRELESS COMMUNICATION SYSTEM

(71) Applicant: Samsung Electronics Co., Ltd., Suwon-si, Gyeonggi-do (KR)

(72) Inventors: Sangsoo Jeong, Suwon-si (KR); Hanna Lim, Seoul (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/199,693

(22) Filed: Nov. 26, 2018

(65) Prior Publication Data
US 2019/0098486 A1 Mar. 28, 2019

Related U.S. Application Data

(63) Continuation of application No. 13/708,015, filed on Dec. 7, 2012, now Pat. No. 10,142,827.

(30) Foreign Application Priority Data

Dec. 7, 2011 (KR) .................. 10-2011-0130198

(51) Int. Cl.
*H04W 8/06* (2009.01)
*H04W 8/18* (2009.01)
(Continued)

(52) U.S. Cl.
CPC .............. *H04W 8/06* (2013.01); *H04W 4/14* (2013.01); *H04W 8/18* (2013.01); *H04W 88/18* (2013.01); *H04W 92/24* (2013.01)

(58) Field of Classification Search
CPC ....... H04W 92/18; H04W 60/00; H04W 8/04; H04W 60/06; H04W 64/00;
(Continued)

(56) References Cited

U.S. PATENT DOCUMENTS 6,956,832 B1 10/2005 Muhonen et al.
8,243,725 B2 8/2012 Aghili et al.
(Continued)

FOREIGN PATENT DOCUMENTS

CN 102196386 A 9/2011

OTHER PUBLICATIONS

CATT, Correction to LAI derivation for default SGs scenario, 3GPP TSG-CT WG1#65 C1-102781, Aug. 13, 2010, Dublin, Ireland.
(Continued)

*Primary Examiner* — Natasha W Cosme
(74) *Attorney, Agent, or Firm* — Jefferson IP Law, LLP

(57) ABSTRACT

A method and an apparatus for controlling Short Message Service (SMS) delivery to a User Equipment (UE) over a Packet-Switched (PS) network without involvement of any Circuit Switched (CS) network node are provided. The method includes receiving subscriber information of a terminal from a Home Subscriber Server (HSS), determining whether the MME supports short message delivery over a Packet-Switched (PS) network, and transmitting, when the MME supports the short message delivery over the PS network, a registration request message including information for routing the short message to the MME to the HSS. The SMS delivery method and apparatus is capable of delivering the SMS message to the UE over the PS network without involvement of the CS network nodes, thereby negating the necessity of CS network nodes for supporting SMS service, resulting in reduction of maintenance and management costs.

22 Claims, 12 Drawing Sheets

(51) Int. Cl.
  *H04W 4/14*     (2009.01)
  *H04W 88/18*    (2009.01)
  *H04W 92/24*    (2009.01)

(58) Field of Classification Search
  CPC ........... H04W 72/0453; H04W 84/045; H04W 88/02; H04W 8/02; H04W 8/10; H04W 36/0055; H04W 48/14; H04W 4/14; H04W 4/20; H04W 72/02; H04W 72/04; H04W 72/042; H04W 76/14; H04W 84/042; H04W 88/10; H04L 29/06197; H04L 29/06217; H04L 29/06244; H04L 29/06326; H04L 29/06523; H04L 65/1006; H04L 65/1016; H04L 65/104; H04L 65/105; H04L 65/1069
  USPC ........................................................ 455/432
  See application file for complete search history.

(56) References Cited

U.S. PATENT DOCUMENTS

| | | |
|---|---|---|
| 8,744,437 B2 | 6/2014 | Zhu et al. |
| 2010/0265884 A1 | 10/2010 | Vikberg et al. |
| 2010/0323695 A1 | 12/2010 | Kallio et al. |
| 2011/0021216 A1 | 1/2011 | Pudney et al. |
| 2011/0098063 A1 | 4/2011 | Richardson |
| 2011/0103277 A1 | 5/2011 | Watfa et al. |
| 2011/0165898 A1 | 7/2011 | Drevon et al. |
| 2011/0191430 A1 | 8/2011 | Griot et al. |
| 2011/0280217 A1 | 11/2011 | Drevon et al. |
| 2013/0344867 A1 | 12/2013 | Rahman et al. |
| 2014/0016614 A1 | 1/2014 | Velev et al. |

OTHER PUBLICATIONS

Japanese Office Action dated Mar. 12, 2018, issued in Japanese Application No. 2014-545823.
3rd Generation Partnership Project; Technical Specification Group Services and System Aspects; Circuit Switched (CS) Fallback in Evolved Packet System (EPS); Stage 2 (Release 10), 3GPP TS 23.272, Sep. 2011, vol. SA WG2 No. V10.5.0, 3GPP, Sophia-Antipolis, France.
CATT, Default MSC Concept for SMS Delivery with PS Only Subscription, SA WG2 Meeting #88, Nov. 14-18, 2011, pp. 1-5, S2-115082, 3GPP, Sophia-Antipolis, France.
3rdGeneration Partnership Project; Technical Specification Group Services and System Aspects; System Improvements for Machine-Type Communications; (Release 11), 3GPP TR 23.888, Nov. 2011, vol. SA WG2, No. V1.6.0, 3GPP, Sophia-Antipolis, France.
Qualcommon Incorporated, "SME in MME for PS-Only SMS", 3GPP TSG-SA WG2 #88, S2-115005, pp. 2-5, Nov. 18, 2011.
Alcatel-Lucent, "Native SMS over NAS for PS only devices", 3GPP TSG-SA WG2 #88, S2-115472, pp. 2-4, Nov. 19, 2011.

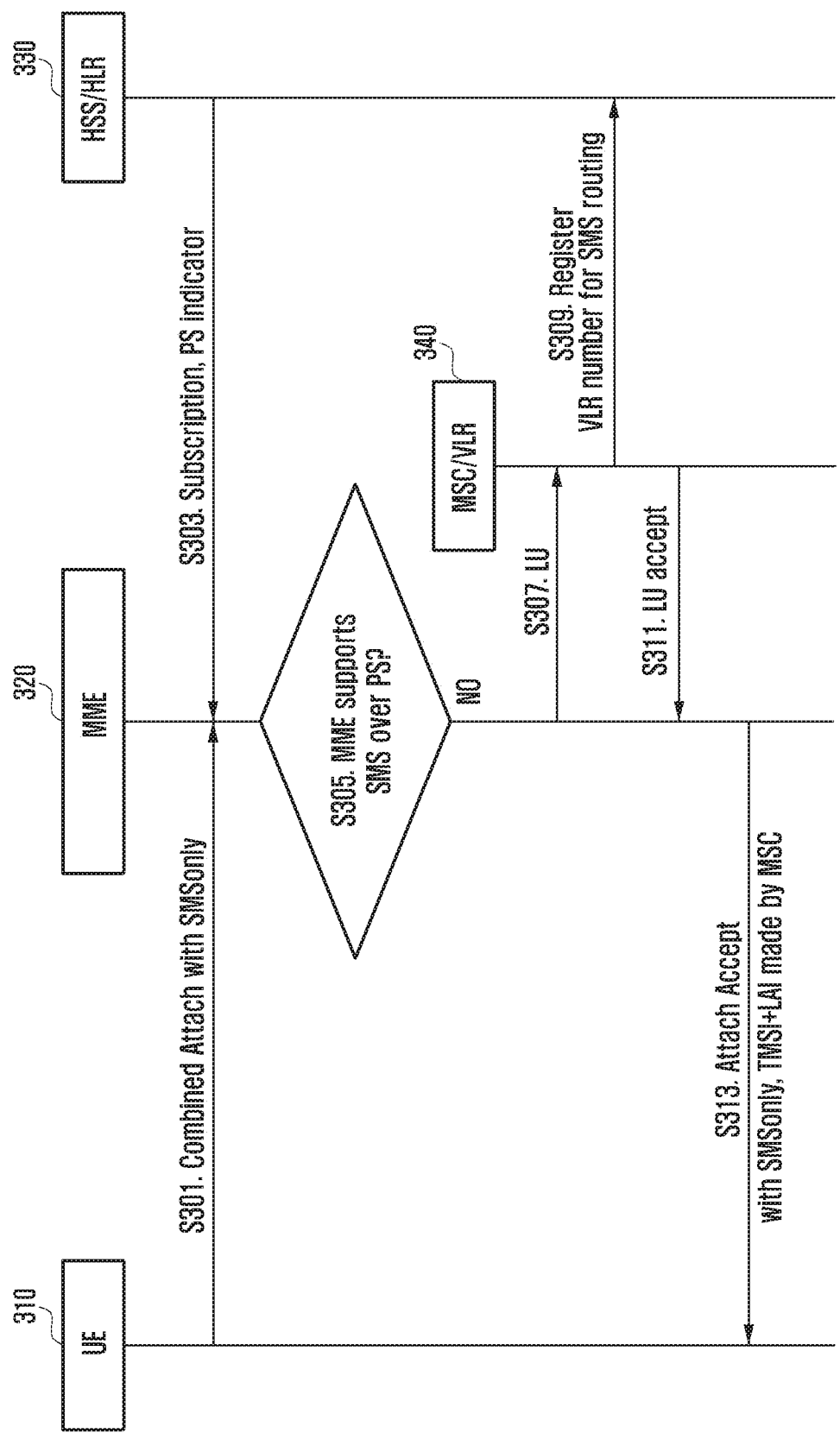

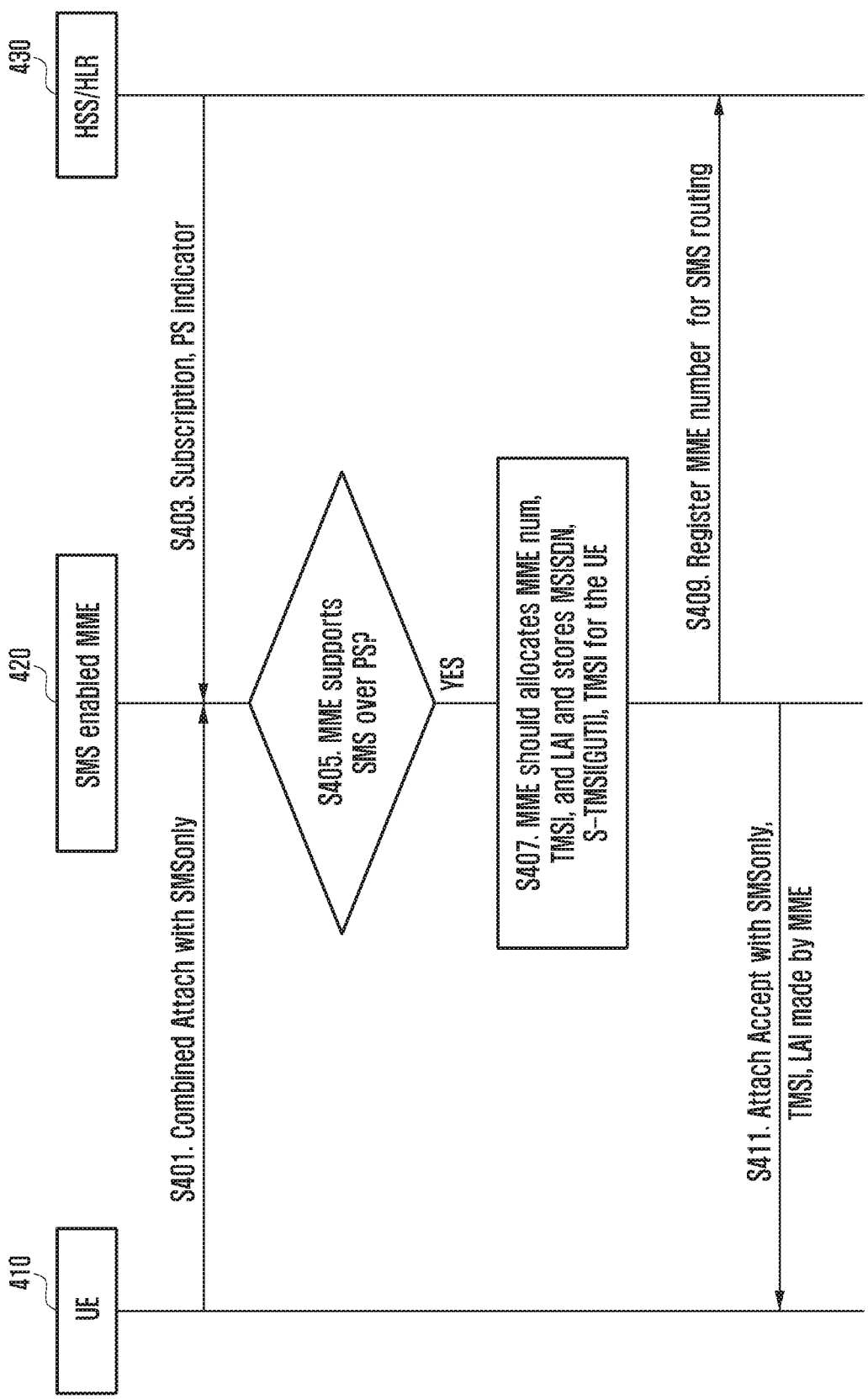

APPARATUS AND METHOD FOR DELIVERING SHORT MESSAGE SERVICE EFFICIENTLY IN WIRELESS COMMUNICATION SYSTEM

CROSS-REFERENCE TO RELATED APPLICATION(S)

This application is a continuation application of prior application Ser. No. 13/708,015, filed on Dec. 7, 2012, which will issue as U.S. Pat. No. 10,142,827 on Nov. 27, 2018 and was based on and claimed priority under 35 U.S.C. § 119(a) of a Korean patent application filed on Dec. 7, 2011 in the Korean Intellectual Property Office and assigned Serial No. 10-2011-0130198, the entire disclosure of which is hereby incorporated by reference.

BACKGROUND

1. Field

The present invention relates to a wireless communication system. More particularly, the present invention relates to a method and apparatus for controlling Short Message Service (SMS) delivery to a User Equipment (UE) over a Packet-Switched (PS) network without involvement of any Circuit Switched (CS) network node.

2. Description of the Related Art

Mobile communication systems developed to provide the subscribers with voice communication services on the move. With the rapid advance of technologies, the mobile communication systems have evolved to support high speed data communication services as well as the standard voice communication services. However, the limited resource and user requirements for higher speed services in the current mobile communication system spur the evolution to more advanced mobile communication systems.

Meanwhile, the Short Message Service (SMS) has been provided in Circuit Switched (CS) domain. FIG. 1 shows an exemplary procedure for delivering Mobile Terminating (MT) SMS to the User Equipment (UE) in the 3rd Generation Partnership Project Long Term Evolution (3GPP LTE) system.

FIG. 1 is a diagram illustrating an SMS transmission procedure under assistance of CS network in a system according to the related art.

Referring to FIG. 1, the SMS message that arrived at an SMS-Service Center (SMS-SC) 110 is transferred to the SMS Gateway Mobile Switching Center (SMS-GMSC) 120 at step S101.

If the SMS message is received, the SMS-GMSC 120 requests the Home Location Register (HLR) 130 for routing information with the recipient address at step S103.

The HLR 130 searches its database for the corresponding recipient address to notify the SMS-GMSC of the address of the Visitor Location Register (VLR) 140 to which the UE having the recipient address belongs at step S103. The SMS-GMSC 120 checks the address of the VLR to which the UE belongs and forwards the SMS message to the corresponding VLR 140 identified by the VLR address at step S105.

Upon receipt of the SMS message, the VLR 140 forwards the SMS message to the MME 150 at step S107. At this time, the recipient ID (i.e., Mobile Station International ISDN Number (MSISDN)) of the SMS message is converted to a Temporary Mobile Subscriber Identity (TMSI) as a temporary ID for use in a CS network.

The Mobility Management Entity (MME) 150 retrieves the SAE-Temporary Mobile Subscriber Identity (S-TMSI) as an ID for use in the PS network from the TMSI and transports the SMS message to the UE 170 identified by the S-TMSI via the evolved Universal Mobile Telecommunications System (UMTS) Terrestrial Radio Access (E-UTRAN) 160 at step S109.

Meanwhile, Long Term Evolution (LTE) is a network optimized for PS data transmission and thus it is typical for the UE to perform attach/registration to the PS network. In the system of FIG. 1, however, it is shown that the UE attached to the PS network has to use the VLR/MCS 140 as a CS network node for SMS transmission.

The network operators adopted LTE for providing the smartphone users with data-centric services and the service providers providing voice call service over the LTE network (i.e., Voice over IP (VoIP)) rather than the CS network, it can be a significant burden to maintain and manage the CS network nodes such as VLR/MSC 140 only for providing the SMS service.

There is therefore a need of a study on the function for providing the subscribers with SMS over PS network without the MSC 140 (i.e., CS infrastructure).

Therefore, a need exists for a method and apparatus for controlling Short Message Service (SMS) delivery to a User Equipment (UE) over a Packet-Switched (PS) network without involvement of any Circuit Switched (CS) network node.

The above information is presented as background information only to assist with an understanding of the present disclosure. No determination has been made, and no assertion is made, as to whether any of the above might be applicable as prior art with regard to the present invention.

SUMMARY

Aspects of the present invention are to address at least the above-mentioned problem and/or disadvantages and to provide at least the advantages described below. Accordingly, an aspect of the present invention is to provide a method and apparatus for providing the users with Short Message Service (SMS) over a Packet Switched (PS) network without involvement of the Circuit-Switched (CS) network nodes such as Visitor Location Register (VLR)/Mobile Switching Center (MSC).

In a system according to another aspect of the present invention, the Mobility Management Entity (MME) equipped with SMS delivery function (SMS-enabled MME) is capable of delivering an SMS message without involvement of CS network nodes and processing user registration and mobility management for SMS delivery.

In a system according to another aspect of the present invention, the HSS/HLR storing subscriber information or the UE notifies the MME that the user is the PS-only subscriber wanting PS data service and SMS service, and the MME processes, if it can deliver the SMS with this information without assistance of CS network, the UE registration for SMS delivery and mobility management by itself and, otherwise, processes the UE registration for SMS delivery and mobility management in cooperation with the CS network nodes.

In accordance with an aspect of the present invention, a short message delivery control method of a Mobility Management Entity (MME) of a wireless communication system is provided. The method includes receiving subscriber information of a terminal from a Home Subscriber Server (HSS), determining whether the MME supports short message delivery over a PS network, and transmitting, when the MME supports the short message delivery over the PS network, a registration request message including information for routing the short message to the MME to the HSS.

In accordance with another aspect of the present invention, a short message delivery method of a Home Subscriber Server (HSS) of a wireless communication system is provided. The method includes transmitting subscriber information of a terminal to a Mobility Management Entity (MME), receiving a registration request message from the MME, the registration request message including information for routing a short message addressed to the terminal to the MME, receiving a routing information request message for routing the short message addressed to the terminal from a short message gateway, and transmitting, to the short message gateway, information on the MME to which the short message addressed to the terminal is routed.

In accordance with another aspect of the present invention, a location update method of a terminal in a wireless communication system is provided. The method includes transmitting a registration request message to an MME, receiving, when the mobility management entity supports short message delivery over a packet-switched network, a registration response message including a terminal identifier and a location area identifier from the mobility management entity, receiving, when the terminal moves to a new network, system information broadcast by the new network, and performing location update using the location area identifier included in the system information, wherein the terminal identifier and the location area identifier received from the MME are not used in a 2nd Generation/3rd Generation (2G/3G) network.

In accordance with another aspect of the present invention, a Mobility Management Entity (MME) for controlling short message delivery in a wireless communication system is provided. The MME includes an interface unit configured to communicate signals with a node of the wireless communication system, and a control unit configured to control receiving subscriber information of a terminal from a Home Subscriber Server (HSS), control determining whether the MME supports short message delivery over a PS network, and control transmitting, when the MME supports the short message delivery over the PS network, a registration request message including information for routing the short message to the MME to the HSS.

In accordance with another aspect of the present invention, a Home Subscriber Server (HSS) for delivering a short message in a wireless communication system is provided. The HSS includes an interface unit configured to communicate signals with a node of the wireless communication system, and a control unit configured to control transmitting subscriber information of a terminal to an MME, control receiving a registration request message from the MME, the registration request message including information for routing a short message addressed to the terminal to the MME, control receiving a routing information request message for routing the short message addressed to the terminal from a short message gateway, and control transmitting, to the short message gateway, information on the MME to which the short message addressed to the terminal is routed.

In accordance with still another aspect of the present invention, a terminal for performing location update in a wireless communication is provided. The terminal includes a radio communication unit configured to communicate signals with a node of the wireless communication system, and a control unit configured to control transmitting a registration request message to a MME, control receiving, when the MME supports short message delivery over a PS network, a registration response message including a terminal identifier and a location area identifier from the MME, control receiving, when the terminal moves to a new network, system information broadcast by the new network, and control performing location update using the location area identifier included in the system information, wherein the terminal identifier and the location area identifier received from the MME are not used for the location update.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a signal flow diagram illustrating the attach procedure when the operator network does not support the SMS delivery over a PS network according to an exemplary embodiment of the present invention;

FIG. 4 is a signal flow diagram illustrating the attach procedure when the operator network supports the SMS delivery over a PS network according to an exemplary embodiment of the present invention.

Throughout the drawings, like reference numerals will be understood to refer to like parts, components, and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For example, exemplary embodiments of the present invention can be applied to the systems configured with the terminals having the communication function similar to that of User Equipment (UE), a network node equipped with the Packet Switched (PS) data transmission control function similar to that of Mobility Management Entity (MME), a network node equipped with the CS data transmission control function similar to that of MSC, and a database node with subscriber information and location information storage function similar to that of a Home Subscriber Server/Home Location Register (HSS/HLR).

Although the exemplary embodiment of the present invention are directed to the Mobile Terminating SMS, exemplary embodiments of the present invention are applicable to the Mobile Origination SMS or other small data transmission services with slight modification without departing from the scope of the present invention.

Figure 2:
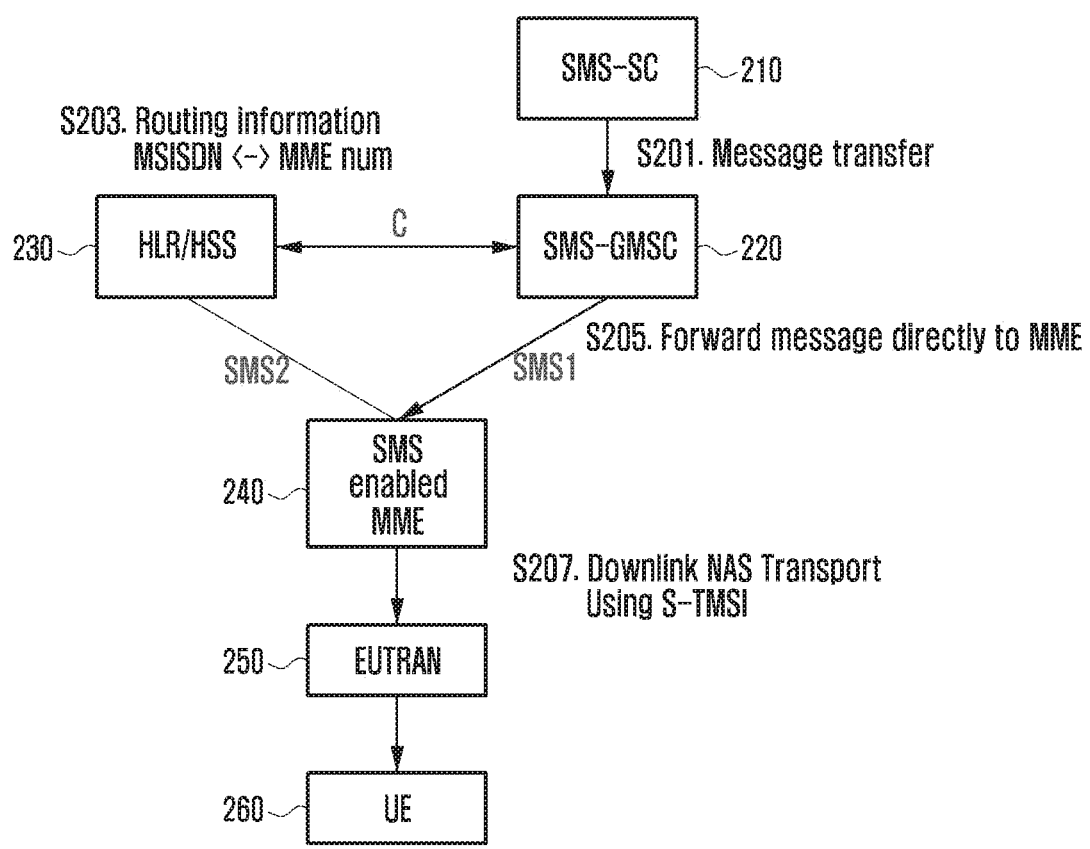
FIG. 2 is a diagram illustrating an attach procedure in a system not supporting SMS delivery over a Packet-Switched (PS) network according to an exemplary embodiment of the present invention.

FIG. 2 is a diagram illustrating an attach procedure in the system not supporting Short Message Service (SMS) delivery over a PS network according to an exemplary embodiment of the present invention. For example, FIG. 2 is a diagram illustrating the network architecture for providing UE with SMS over a PS network without involvement of a Circuit Switched (CS) network according to an exemplary embodiment of the present invention.

Referring to FIG. 2, the SMS-Service Center (SMS-SC) 210 transfers a message to the SMS Gateway Mobile Switching Center (SMS-GMSC) 220 at step S201. Thereafter, at step S203, the SMS-GMSC 220 requests the HSS/HLR 230 for routing information to search, with the recipient number, for a core network node to which the message is delivered. Unlike the system according to the related art in which the information on the Visitor Location Register (VLR)/Mobile Switching Center (MCS) of the CS network is notified to the UE, the HSS/HLR 230 notifies of the information on the SMS-enabled Mobility Management Entity (MME) 240 (e.g. MME number) in an exemplary embodiment of the present invention.

The SMS-GMSC 220 forwards the SMS message to the MME 240 corresponding to the received MME number at step S205.

Upon receipt of the SMS message, the MME 240 transports the SMS message to the UE 260 by referencing the mapping table which maps the recipient number of the message with PS network identifier at step S207. In order to accomplish this, the MME 240 sends a downlink Non-Access Stratum (NAS) transmission message including UE's S-Temporary Mobile Subscriber Identity (S-TMSI) for use in the packet network to an evolved Universal Mobile Telecommunications System (UNITS) Terrestrial Radio Access (E-UTRAN) 250, and the E-UTRAN 250 sends the message to the corresponding UE using the TMS corresponding to the UE identifier (S-TMSI).

Figure 1:
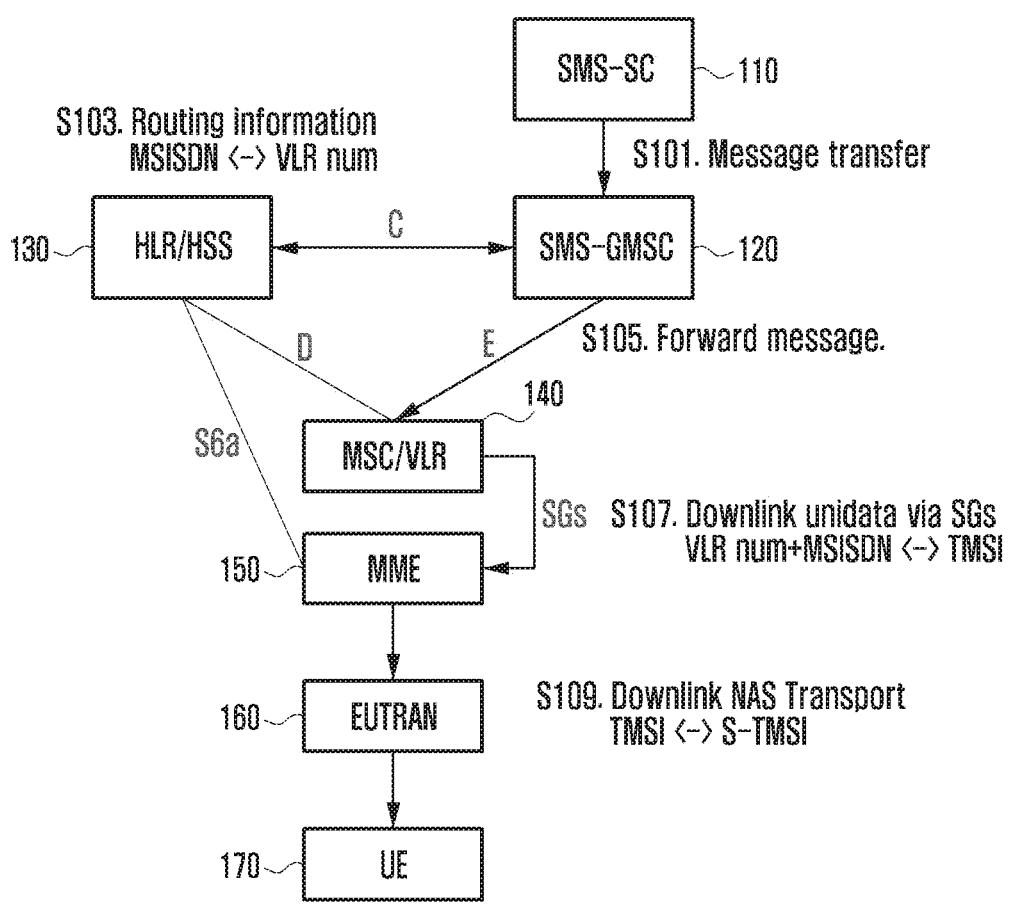
FIG. 1 is a diagram illustrating a Short Message Service (SMS) transmission procedure under assistance of a Circuit Switched (CS) network in a system according to the related art.

Unlike the legacy network architecture according to the related art as shown in FIG. 1, the network according to an exemplary embodiment of the present invention is configured such that the SMS-GMSC 220 sends the SMS message to the MME 240 directly through SMS1 interface as shown in FIG. 2.

FIGS. 3 and 4 show the attach/registration procedure depending on whether a UE is subscribed to PS-only service and capable of transmitting SMS through PS network of the core network according to an exemplary embodiment of the present invention.

FIG. 3 is a signal flow diagram illustrating the attach procedure when the operator network does not support the SMS delivery over a PS network according to an exemplary embodiment of the present invention. FIG. 4 is a signal flow diagram illustrating the attach procedure when the operator network supports the SMS deliver over a PS network according to an exemplary embodiment of the present invention.

First, a description is made of the attach procedure in the operator network which does not support the SMS delivery over the PS network with reference to FIG. 3.

Referring to FIG. 3, the UE 310 sends an Attach Request message to the MME 320 for receiving the operator network service at step S301. Here, the UE 310 does not know yet whether the operator network supports the SMS delivery over the PS network so as to perform the combined attach procedure as in the attach procedure for receiving SMS over the CS network according to the related art. Accordingly, the Attach Request message transmitted at step S301 may include the information requesting for SMS service as well as the information on the normal attach request for PS service and possibly CS service, and this can be achieved with an indicator.

In the attach procedure, the MME 320 receives the subscription information of the user from the HSS/HLR 330 at step S303. The subscription information may include the information indicating that the user is the valid subscriber to the PS service and the indicator indicating that the UE needs the SMS service in addition.

The MME 320 is capable of determining based on the indicator received at step S303 or the information received from the UE at step S301 whether the UE 310 is the UE subscribed to the PS service and, if the network supports SMS delivery of over the PS network, whether it is necessary to deliver the SMS message over the PS network.

The MME 320 determines whether it supports the SMS delivery over a PS network (SMS in MME) at step S305. If the MME 320 does not support the SMS delivery over PS, the SMS message has to delivered under the assistance of a legacy CS network node (e.g. VLR/MSC 340). Accordingly, the MME 320 performs the combined attach procedure according to the related art in cooperation with the VLR/MSC 340 through steps S307 to S313.

For example, according to an exemplary embodiment of the present invention, at step S307, the MME 320 forwards a request to the VLR 340 for routing the SMS message. For example, the MME 320 forwards a Location Update (LU) request to the VLR 340. At step S308, the VLR 340 registers with the HSS/HLR 330 the VLR number corresponding to the VLR 340 for SMS routing. At step S309, the VLR 340 sends a confirmation to the MME 320 that the request for routing the SMS message is accepted. For example, the VLR 340 sends a Location Update Accept message to the MME 320. At step S313, the MME 320 transmits to the UE 310 an acceptance to the Attach Request message.

A description is made of the attach procedure in the operator network which supports the SMS delivery over PS network with reference to FIG. 4.

FIG. 4 is a signal flow diagram illustrating the attach procedure based on whether the UE requires PS data and SMS services and whether the core network supports SMS delivery over the PS network according to an exemplary embodiment of the present invention.

The UE 410 sends an Attach Request message to an MME 420 for receiving operator network service at step S401. Here, the MME 420 is the SMS-enabled MME capable of delivering SMS message over PS network. Because it does not know yet whether the operator network support the SMS delivery over PS network, the UE has to perform the combined attach procedure in the same way as the attach procedure according to the related art for SMS over CS network. Accordingly, the Attach Request message transmitted at step S401 may include the information requesting for SMS service over PS network as well as the information on the normal attach request for PS service and possibly CS service, and this can be achieved with an indicator.

In the attach procedure, the MME 420 receives the subscription information of the user from the HSS/HLR 430 at step S403. The subscription information may include the information indicating that the user is the valid subscriber to the PS service and the indicator indicating that the UE needs the SMS service as well.

The MME 420 is capable of determining based on the indicator received at step S403 or the information received from the UE at step S401 whether the UE 410 is the UE subscribed to the PS service and, if the network supports SMS message delivery over the PS network, whether it is necessary to deliver the SMS message over the PS network.

The MME 420 determines whether it supports the SMS delivery over the PS network (e.g., SMS in MME) at step S405.

If it supports the SMS delivery over the PS network, the MME 420 allocates an MME number (or address) for SMS message routing of the SMS-GSMC, a UE identifier used in attaching to the CS network (e.g. Temporary Mobile Subscriber Identity (TMSI)), and Location Area Identification (LAI) at step S407.

The MME 420 also allocates SAE-Temporary Mobile Subscriber Identity (S-TMSI) corresponding to Mobile Station International ISDN Number (MSISDN) and TMSI to the UE 410 which has transmitted the Attach Request message and stores the MSISDN, S-TMSI, and TMSI in the mapping table as shown in Table 1. The mapping table can be created for all UEs which have transmitted the Attach Request message.

TABLE 1

| MSISDN | S-TMSI | TMSI |
| --- | --- | --- |
| A1 | A2 | A3 |
| B1 | B2 | B3 |
| — | — | — |
| — | — | — |
| — | — | — |

Unlike the procedure according to the related art in which the TMSI and LAI are allocated and sent to the UE for actual use, the TMSI and LAI shown in FIG. 4 may not be used for actual message transmission in the attach procedure according to an exemplary embodiment of the present invention. In the procedure of FIG. 4, the TMSI and LAI are used, when the UE has sent the combined Attach Request, to forward the information which has been determined already to receive from the MME (i.e., TMSI and LAI) so as to deliver the SMS message with SMS-enabled MME as the newly introduced function without modification in protocol/implementation.

Meanwhile, the MME 420 registers the MME information (e.g., MME number/address) allocated for message routing with the HSS/HLR 430 at step S409 as described with reference to step S203 of FIG. 2.

At this time, the user registration process between the MME 420 and the HSS/HLR 430 is performed through the SMS2 interface (see FIG. 2) as the interface between the MME 420 and HSS/HLR 430. Afterward, the MME 420 notifies the UE 410 that the registration has completed successfully by transmitting an Attach Accept message along with the TMSI and LAI made by the MME at step S411.

Although FIG. 4 is directed to the case in which the UE 410 initiates the attach/registration procedure to the operator network such that the MME 420 and HSS 430 configure the SMS routing through steps S401 to S411, every step can be performed independently. The individual steps are depicted in FIGS. 5A, 5B, and 5C.

Figure 5A:
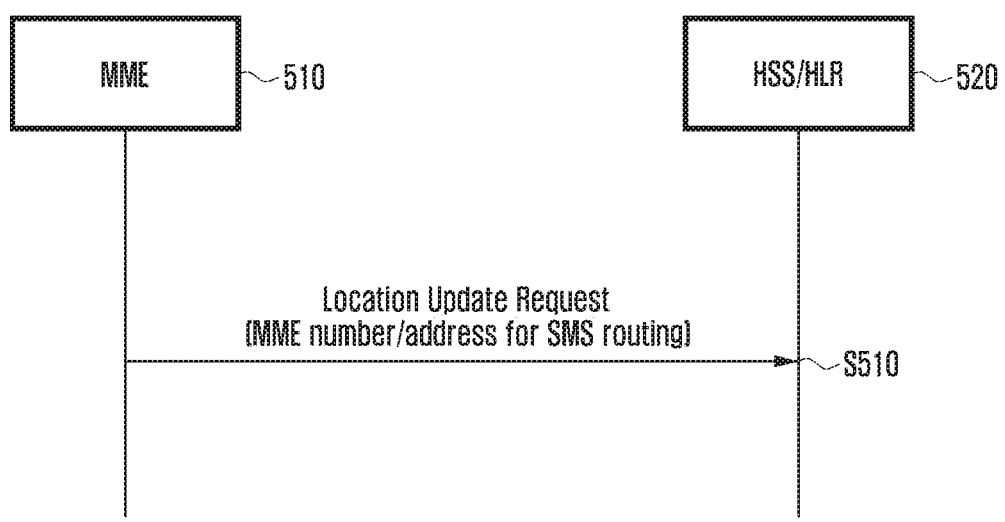
FIG. 5A is a signal flow diagram illustrating a step of transmitting a registration request message in an SMS delivery method according to an exemplary embodiment of the present invention.

FIG. 5A is a signal flow diagram illustrating a step of transmitting a registration request message in an SMS delivery method according to an exemplary embodiment of the present invention. For example, FIG. 5A is a signal flow diagram illustrating a step of transmitting a registration request message including routing information (e.g., number or address) of an MME instead of Mobile Switching Center (MSC)/Visitor Location Register (VLR) from the MME to the HSS (or HLR) in the SMS delivery method according to an exemplary embodiment of the present invention.

Referring to FIG. 5A, at step S510, the MME 510 sends the registrations request message to the HSS (or HLR) 520. The registration request message transmitted by the MME 510 is the message for use in UE location registration, subscription information request message for UE, or Location Update Request (or Update Location Request) message.

Figure 5B:
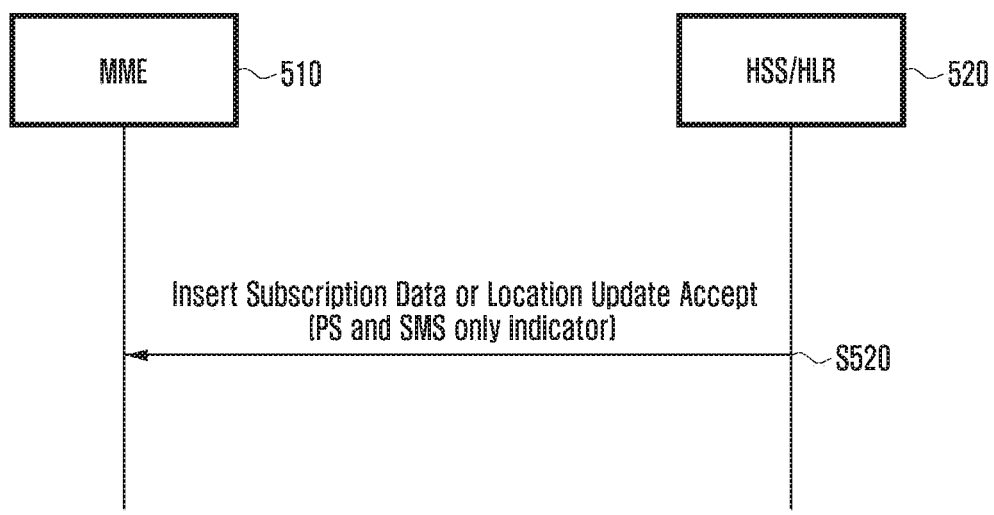
FIG. 5B is a signal flow diagram illustrating a step of transmitting a message including PS and SMS-only indicator in an SMS delivery method according to an exemplary embodiment of the present invention.
Figure 5C:
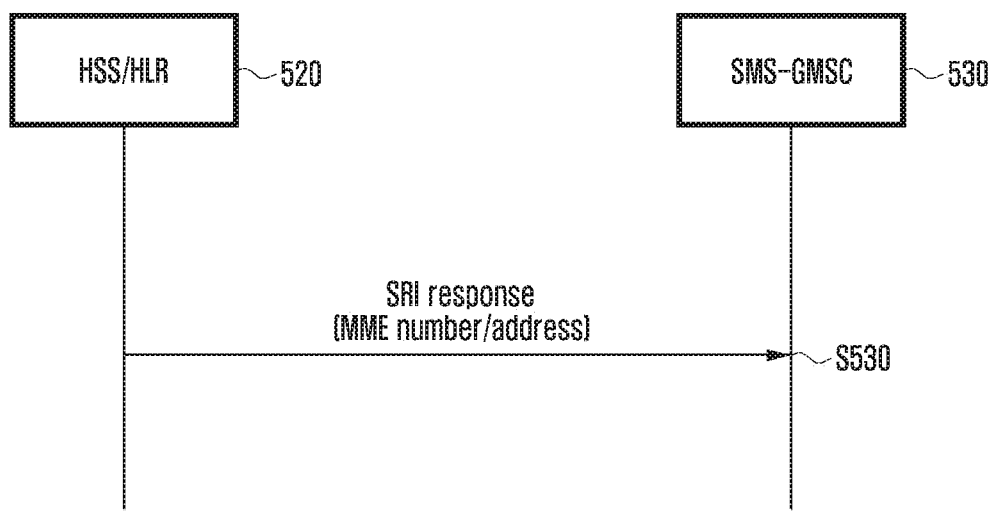
FIG. 5C is a signal flow diagram illustrating a step of notifying the HSS of the number (or address) of a Mobility Management Entity (MME) in an SMS delivery method according to an exemplary embodiment of the present invention.

FIG. 5B is a signal flow diagram illustrating a step of transmitting a message including PS and SMS-only indicator in an SMS delivery method according to an exemplary embodiment of the present invention. For example, FIG. 5B is a signal flow diagram illustrating a step of transmitting a message including PS and SMS-only indicator as a piece of subscription information of the user transmitted from the HSS (HLR) 520 to the MME 510 according to an exemplary embodiment of the present invention.

Referring to FIG. 5B, the HSS (or HLR) 520 transmits the message including PS and SMS-only indicator as shown at step S520. As an example, the PS and SMS-only indicator is a type of the subscription information indicating that the user uses only the PS service and SMS service.

According to exemplary embodiments of the present invention, the message transmitted by the HSS (or HLR) 520 can be the message for providing the subscriber information to the MME or responding to the location registration (e.g., Insert Subscription Data or Location Update Accept/Update Location Accept).

FIG. 5C is a signal flow diagram illustrating a step of notifying the HSS of the number (or address) of an MME in an SMS delivery method according to an exemplary embodiment of the present invention. For example, FIG. 5C is a signal flow diagram illustrating a step of notifying the HSS, of the number (or address) of the MME when the SMS-GMSC requests the HSS/HLR for SMS transmission path to the user (UE) according to an exemplary embodiment of the present invention.

Referring to FIG. 5C, the HSS 520 is capable of notifying the SMS-GMSC 530 of the MME 510 as the SMS delivery path by inserting the MME number (or address) in the response message in reply to the Send Route Information (SRI) request of the SMS-GMSC 530 at step S530.

Figure 6:
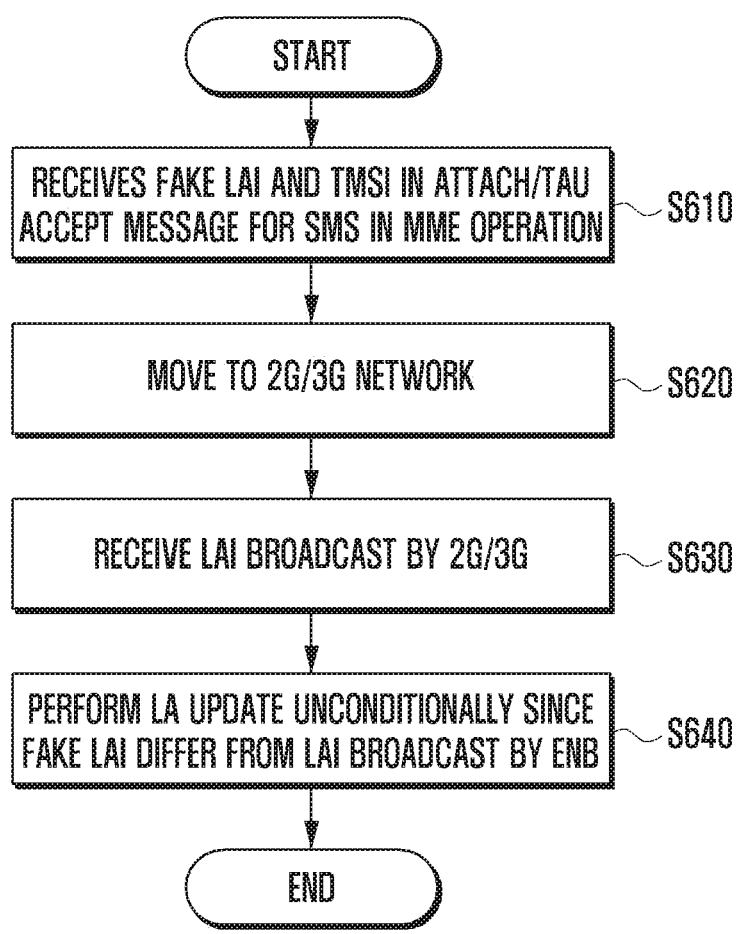
FIG. 6 is a flowchart illustrating the operating procedure of a UE in an SMS delivery method according to an exemplary embodiment of the present invention.

FIG. 6 is a flowchart illustrating the operating procedure of a UE in an SMS delivery method according to an exemplary embodiment of the present invention.

Particularly, FIG. 6 shows a method of processing the LAI and TMSI included in the Attach/TAU Accept message received from the MME in response to the Attach/TAU Request message.

According to an exemplary embodiment of the present invention, when the UE has attached to the SMS-enabled MME (or, SMS in MME), the UE receives the LAI and TMSI which are not used in UE operation from the MME, and these LAI and TMSI are referred to as a fake LAI and a fake TMSI in exemplary embodiments of the present invention. The reason why the fake LAI and fake TMSI are used is because the LAI which is broadcast in the system information for notifying of Location Area in the 2nd Generation (2G)/3rd Generation (3G) network is not inserted into the system information in the real 2G/3G network.

Referring to FIG. 6, the UE first receives the Attach/TAU Accept message from the MME supporting "SMS in MME" at step S610. This message may include the fake LAI and TMSI. The UE moves to a 2G or 3G network according to the user's mobility at step S620.

The UE receives the system information broadcast by the RAN node of the corresponding network and acquires LAI from the system information at step S630.

In the case of the legacy UE, it compares the currently stored LAI with the LAI included in the system information broadcast by the current cell to determine the necessity of location update. In an exemplary embodiment of the present invention, however, the UE receives the fake LAI which is actually used from the MME and thus the fake LAI differs from the LAI for use in the 2G or 3G network.

According to an exemplary embodiment of the present invention, if it moves to the 2G or 3G cell, the UE performs location update procedure because the (fake) LAI received from the MME differs from the LAI which is broadcasted in 2G or 3G cell.

Figure 7:
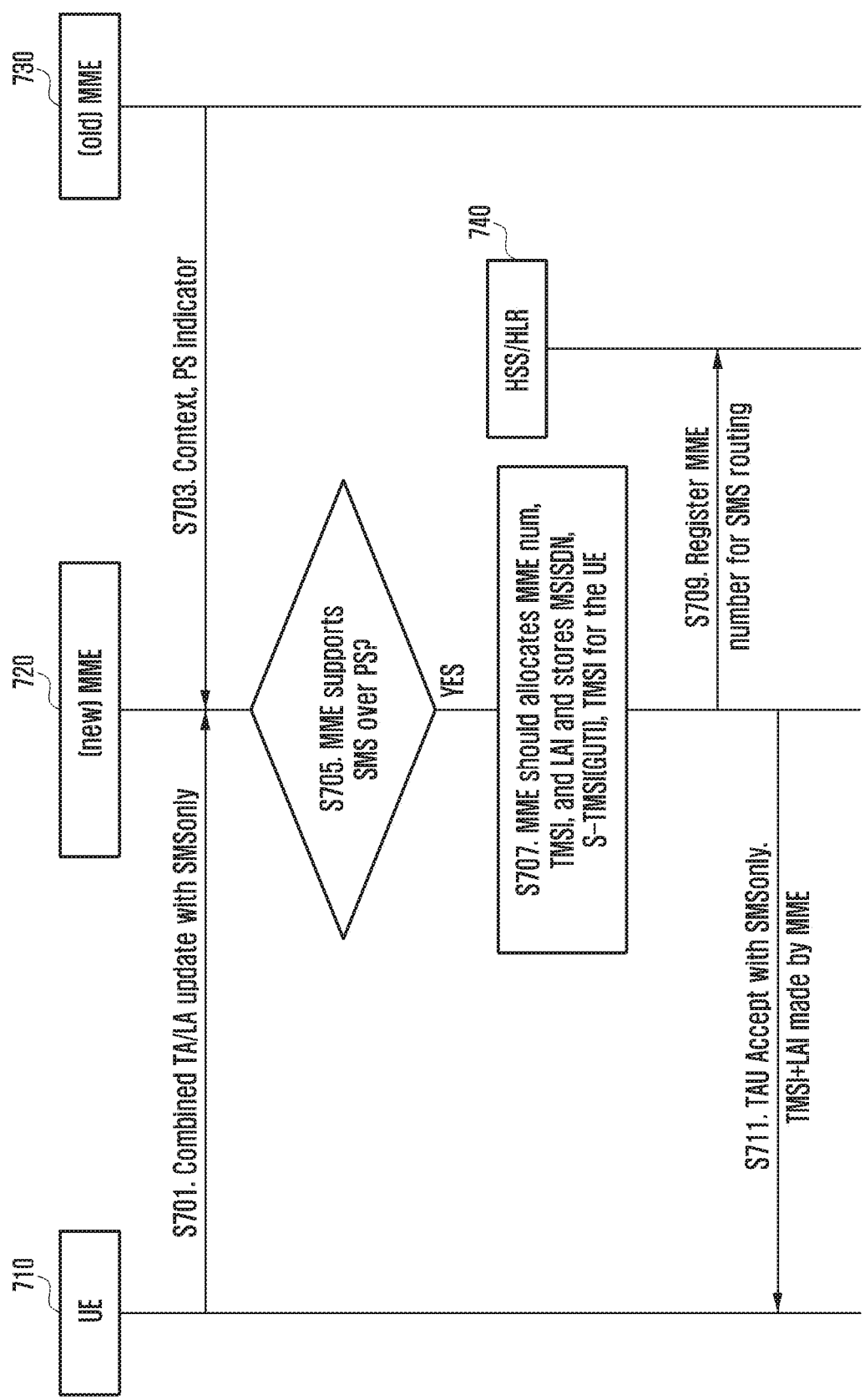
FIG. 7 is a signal flow diagram illustrating the location update procedure in the SMS delivery method according to an exemplary embodiment of the present invention.

FIG. 7 is a signal flow diagram illustrating the location update procedure based on whether the UE is the PS-only UE and whether the core network supports SMS delivery over PS network when the UE attempts Tracking Area Update and the MME managing the UE is changed according to an exemplary embodiment of the present invention.

Referring to FIG. 7, the UE 710 sends a Tracking Area Update (TAU) Request message to the new MME 720 to receive the service in a new area at step S701. At this time, because the UE 710 does not know yet whether the new MME 720 supports SMS delivery over PS network, the UE 710 performs combined TAU procedure in the same way as the conventional registration with the CS network for SMS service.

The TAU Request message may include the information indicating that the UE 710 wants to receive the SMS service as well as PS service, and this can be accomplished with an indicator.

In the TAU procedure, the new MME 720 receives the subscriber information from the HSS/HLR or the old MME 730 which has managed the UE at step S703. Here, the subscriber information includes the indicator indicating that the user is the PS service subscriber and wants to receive the SMS service in addition.

The new MME 720 is capable of determining, based on the indicator received at step S703 or the information received at step 701, whether the corresponding UE 710 is subscribed to the PS service and, if the network supports SMS message delivery over the PS network, whether the SMS message has to be delivered over the PS network.

The new MME 720 determines at step 705 whether it supports the SMS over PS network. If the new MME 720 supports the SMS over PS network, the new MME 720 allocates an MME number for SMS message routing of the SMS-GSMC, TMSI as the identifier used in registration with the CS network, and Location Area Identifier LAI at step S707. Next, the new MME 720 allocates S-TMSI corresponding to MSISDN to the UE 710 which has transmitted the registration (TAU) request message and TMSI and stores the S-TMSI and TMSI in the mapping table as shown in Table 1. The mapping table can be created for all UEs that have transmitted a registration request message.

Unlike the exemplary embodiment of the present invention illustrated in FIG. 3 in which the TMSI and LAI as the information for actual use in the CS network are allocated and transmitted to the UE, the TMSI and LAI described with reference to FIG. 7 are the information predetermined to be received when the UE has transmitted the combined TAU request message so as to make it possible for the SMS-enabled MME to deliver the SMS message over the PS network without modification in protocol/implementation.

The new MME 720 registers the MME number allocated at step S707 for making it possible to route the message with the HSS/HLR 740 at step S709. At this time, the user registration procedure with the HSS/HLR 740 is performed through the interface SMS2 (e.g., see FIG. 2) between the new MME 720 and the HSS/HLR 740 directly.

Afterward, the MME 720 sends the UE 710 the TAU Accept message at step S711 to notify that the TAU request has been accepted. At this time, the TMSI and LAI allocated by the MME 720 are transmitted along with the TAU Accept message.

Figure 8:
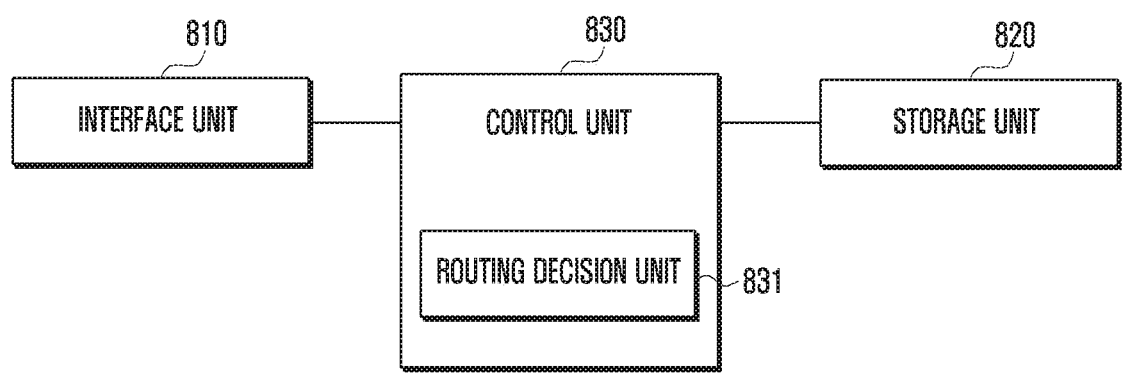
FIG. 8 is a block diagram illustrating a configuration of the MME for supporting the SMS delivery method according to an exemplary embodiment of the present invention.

FIG. 8 is a block diagram illustrating a configuration of the MME for supporting the SMS delivery method according to an exemplary embodiment of the present invention.

Referring to FIG. 8, the MME according to an exemplary embodiment of the present invention includes an interface unit 810, a storage unit 820, and a control unit 830.

The interface unit 810 is provided with wired and wireless communication means for communicating signals with other nodes of the wireless communication network. According to an exemplary embodiment of the present invention, the interface unit 810 can be a wired communication interface but is not limited thereto.

The storage unit 820 stores the programs for operating the MME. According to an exemplary embodiment of the present invention, the storage unit 820 is capable of storing the subscriber information of each UE that is transmitted by the HSS. The MME is capable of determining based on the subscriber information whether the corresponding user is a subscriber to the PS service and whether it is capable of receiving the SMS service in addition.

The control unit 830 controls signal flows among the functions blocks for operating the MME. According to an exemplary embodiment of the present invention, the control unit 830 is also capable of including a routing decision unit 831.

The routing decision unit 831 receives the subscriber information of the UE from the HSS and determines whether the MME is capable of delivering the SMS message addressed to the UE over the packet switched network. When the MME supports the SMS delivery over PS network, the routing decision unit 831 controls to transmit to the HSS a registration message including the information for routing the SMS message to the MME.

If the MME supports SMS delivery over a PS network and if the UE is subscribed to the PS service and is configured to receive the SMS message over the PS network, the control unit 830 allocates a UE identifier and a location area identifier to the UE. The control unit 830 can control to transmit the allocated UE identifier and the location area identifier to the UE. In this case, the location area identifier is not used for UE's location information update.

Also, when a tracking area update message is received from the UE, the control unit 830 determines whether the tracking area update makes it necessary to change the MME for a new MME for managing the UE. If it is necessary to change the MME, the control unit 830 controls to transmit the subscriber information of the UE to the new MME.

Figure 9:
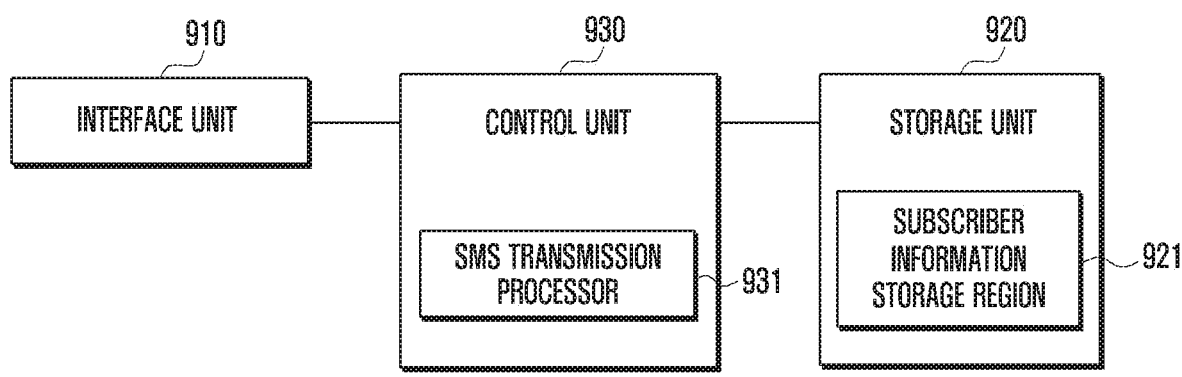
FIG. 9 is a block diagram illustrating the configuration of the Home Subscriber Server (HSS) for supporting the SMS delivery method according to an exemplary embodiment of the present invention.

FIG. 9 is a block diagram illustrating the configuration of the Home Subscriber Server (HSS) for supporting the SMS delivery method according to an exemplary embodiment of the present invention.

Referring to FIG. 9, the HSS includes an interface unit 910, a storage unit 920, and a control unit 930.

The interface unit 910 is provided with wired and wireless communication means for communicating signals with other nodes of the wireless communication network. According to an exemplary embodiment of the present invention, the interface unit 910 can be a wired communication interface but is not limited thereto.

The storage unit 920 stores the programs for operating the HSS. According to an exemplary embodiment of the present invention, the storage unit 920 includes a subscriber information storage region 921 for storing the subscriber information of each UE. The subscriber information is capable of including the information on whether the user of the UE is subscribed to the PS service and SMS service and capable of receiving SMS message over the PS network.

The control unit 930 control signal flows among the functions blocks for operation of the HSS.

The control unit 930 is capable of controlling to transmit the subscriber information of a certain UE to the MME. If a registration message including the information for routing the SMS message addressed to the UE to the MME is received from the MME, the control unit 930 configures the HSS to route the SMS message addressed to the UE to the corresponding MME.

According to an exemplary embodiment of the present invention, the control unit 930 may include an SMS transmission processor 931. If a message requesting for the routing information on the SMS message addressed to the UE is received from the SMS gateway, the SMS transmission processor 931 controls to transmit the information on the MME to which the SMS message addressed to the UE is routed to the SMS gateway.

Figure 10:
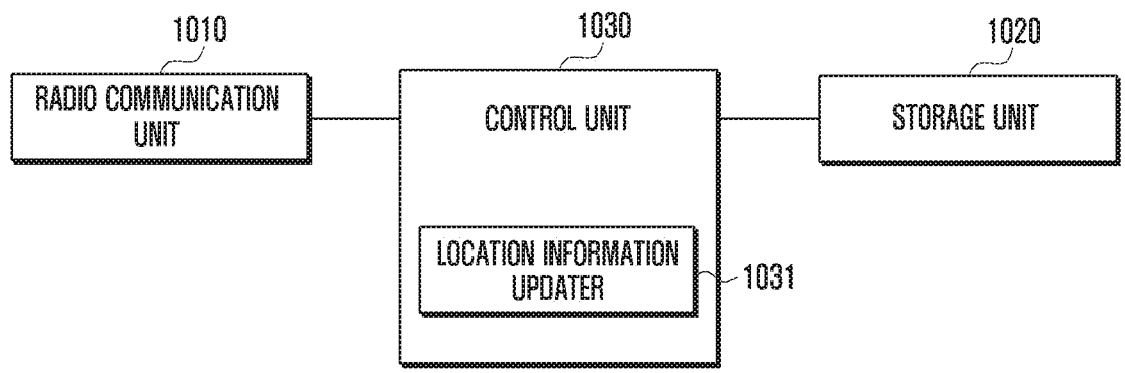
FIG. 10 is a block diagram illustrating the configuration of the UE for supporting the SMS delivery method according to an exemplary embodiment of the present invention.

FIG. 10 is a block diagram illustrating the configuration of the UE for supporting the SMS delivery method according to an exemplary embodiment of the present invention.

Referring to FIG. 10, the UE includes a radio communication unit 1010, a storage unit 1020, and a control unit 1030.

The radio communication unit 1010 is responsible for radio communication with the network nodes of the radio communication network.

The storage unit 1020 stores the programs for operating the UE.

The control unit 1030 controls the signal flows among the function blocks for the operation of the UE according to an exemplary embodiment of the present invention. Particularly, the control unit 1030 can control transmitting a registration request message to the MME and receiving, when the MME supports SMS delivery over PS network for the UE, a registration response message including the UE identifier and location area identifier from the MME.

According to exemplary embodiments of the present invention, the control unit 1030 may also include a location information updater 1031 which controls receiving, when the UE moves to a certain network, the system information broadcast by the new network and performing location area update based on the location area identifier included in the system information. In this case, the UE identifier and the location area identifier received from the MME are not used in the new network.

Although the description has been directed to the case in which the control unit and other functional units are implemented separately to perform different functions, exemplary embodiments of the present invention are not limited thereto. In an exemplary embodiment of the present invention, with regard to the UE, the functionality of the location information updater 1031 can be performed by the control unit 1030.

As described above, the SMS delivery method and apparatus according to exemplary embodiments of the present invention is capable of delivering the SMS message to the UE over the PS network without involvement of the CS network nodes.

Also, the SMS delivery method and apparatus of exemplary embodiments of the present invention are advantageous in negating the necessity of CS network nodes for supporting SMS service, resulting in reduction of maintenance and management costs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a mobility management entity (MME), the method comprising:
receiving, from a terminal, information indicating that the terminal requests short message service (SMS);
determining whether the MME is enabled to use SMS without a mobile switching center (MSC);
transmitting, to a home subscriber server (HSS), information on the MME for SMS routing in case that the MME is enabled to use SMS without the MSC;
receiving, from the HSS, subscriber information including information indicating that the terminal is limited to packet switched (PS) domain services and to SMS;
transmitting, to the terminal, an accept message for SMS based on the subscriber information; and
in case that the MME is enabled to use SMS without the MSC, not performing any registration with at least one of a visitor location register (VLR) or the MSC.

2. The method of claim 1, further comprising:
in case that the MME is not enabled to use SMS without the MSC, performing the registration with at least one of the VLR or the MSC.

3. The method of claim 1,
wherein at least one of a location area identification (LAI) or a temporary mobile subscriber identity (TMSI) is provided to the terminal, and
wherein the LAI is a non-broadcasted LAI and not associated with a LAI broadcasted through system information of a circuit switched domain.

4. The method of claim 1, wherein SMS for the terminal is transferred to the MME through a SMS gateway without passing through the MSC, in case that the MME is enabled to use SMS.

5. A method by a home subscriber server (HSS), the method comprising:
receiving, from a mobility management entity (MME), information on an address of the MME for short message service (SMS) routing in case that the MME is enabled to use SMS without a mobile switching center (MSC);
transmitting, to the MME, subscriber information including information indicating that a terminal is limited to packet switched (PS) domain services and to SMS;
receiving, from an SMS gateway, information for SMS routing for the terminal; and
transmitting, to the SMS gateway, information on the MME to which SMS for the terminal is routed.

6. The method of claim 5,
wherein in case that the MME is enabled to use SMS without the MSC, any registration between the MME and at least one of a visitor location register (VLR) or the MSC is not performed, and
wherein in case that the MME is not enabled to use SMS without the MSC, the registration between the MME and at least one of the VLR or the MSC is performed.

7. The method of claim 5,
wherein at least one of a location area identification (LAI) or a temporary mobile subscriber identity (TMSI) is provided to the terminal, and
wherein the LAI is a non-broadcasted LAI and not associated with a LAI broadcasted through system information of a circuit switched domain.

8. A method by a terminal in a wireless communication system, the method comprising:
transmitting, to a mobility management entity (MME), information indicating that the terminal requests short message service (SMS);

receiving, from the MME, an accept message for SMS based on subscriber information; and
receiving an SMS message for the terminal from the MME,
wherein in case that the MME is enabled to use SMS without a mobile switching center (MSC), any registration between the MME and at least one of a visitor location register (VLR) or the MSC is not performed.

9. The method of claim 8, wherein in case that the MME is not enabled to use SMS without the MSC, the registration between the MME and at least one of the VLR or the MSC is performed.

10. The method of claim 8,
wherein at least one of a location area identification (LAI) or a temporary mobile subscriber identity (TMSI) is provided to the terminal, and
wherein the LAI is a non-broadcasted LAI and not associated with a LAI broadcasted through system information of a circuit switched domain.

11. The method of claim 8, wherein SMS for the terminal is transferred to the MME through a SMS gateway without passing through the MSC, in case that the MME is enabled to use SMS.

12. A mobility management entity (MME) comprising:
a transceiver; and
a controller coupled with the transceiver and configured to:
receive, from a terminal, information indicating that the terminal requests short message service (SMS),
determine whether the MME is enabled to use SMS without a mobile switching center (MSC),
transmit, to a home subscriber server (HSS), information on the MME for SMS routing in case that the MME is enabled to use SMS without the MSC,
receive, from the HSS, subscriber information including information indicating that the terminal is limited to packet switched (PS) domain services and to SMS,
transmit, to the terminal, an accept message for SMS based on the subscriber information, and
in case that the MME is enabled to use SMS without the MSC, not perform any registration with at least one of a visitor location register (VLR) or the MSC.

13. The MME of claim 12, wherein the controller is further configured to:
in case that the MME is not enabled to use SMS without the MSC, perform the registration with at least one of the VLR or the MSC.

14. The MME of claim 12,
wherein at least one of a location area identification (LAI) or a temporary mobile subscriber identity (TMSI) is provided to the terminal, and
wherein the LAI is a non-broadcasted LAI and not associated with a LAI broadcasted through system information of a circuit switched domain.

15. The MME of claim 12, wherein SMS for the terminal is transferred to the MME through a SMS gateway without passing through the MSC, in case that the MME is enabled to use SMS.

16. A home subscriber server (HSS) comprising:
a transceiver; and
a controller coupled with the transceiver and configured to:
receive, from a mobility management entity (MME), information on an address of the MME for short message service (SMS) routing in case that the MME is enabled to use SMS without a mobile switching center (MSC), transmit, to the MME, subscriber information including information indicating that a terminal is limited to packet switched (PS) domain services and to SMS, receive, from an SMS gateway, information for SMS routing for the terminal, and transmit, to the SMS gateway, information on the MME to which SMS for the terminal is routed.

17. The HSS of claim 16, wherein in case that the MME is enabled to use SMS without the MSC, any registration between the MME and at least one of a visitor location register (VLR) or the MSC is not performed, and wherein in case that the MME is not enabled to use SMS without the MSC, the registration between the MME and at least one of the VLR or the MSC is performed.

18. The HSS of claim 16, wherein at least one of a location area identification (LAI) or a temporary mobile subscriber identity (TMSI) is provided to the terminal, and wherein the LAI is a non-broadcasted LAI and not associated with a LAI broadcasted through system information, of a circuit switched domain.

19. A terminal comprising:

a transceiver; and a controller coupled with the transceiver and configured to:

transmit, to a mobility management entity (MME), information indicating that the terminal requests short message service (SMS), receive, from the MME, an accept message for SMS based on subscriber information, and receive an SMS message for the terminal from the MME, wherein, in case that the MME is enabled to use SMS without a mobile switching center (MSC), any registration between the MME and at least one of a visitor location register (VLR) or the MSC is not performed.

20. The terminal of claim 19, wherein in case that the MME is not enabled to use SMS without the MSC, the registration between the MME and at least one of the VLR or the MSC is performed.

21. The terminal of claim 19, wherein at least one of a location area identification (LAI) or a temporary mobile subscriber identity (TMSI) is provided to the terminal, and wherein the LAI is a non-broadcasted LAI and not associated with a LAI broadcasted through system information, of a circuit switched domain.

22. The terminal of claim 19, wherein SMS for the terminal is transferred to the MME through a SMS gateway without passing through the MSC, in case that the MME is enabled to use SMS.

* * * * *